S. S. Putnam,
Curtain Fixture,
Nº 35,779. Patented July 1, 1862.
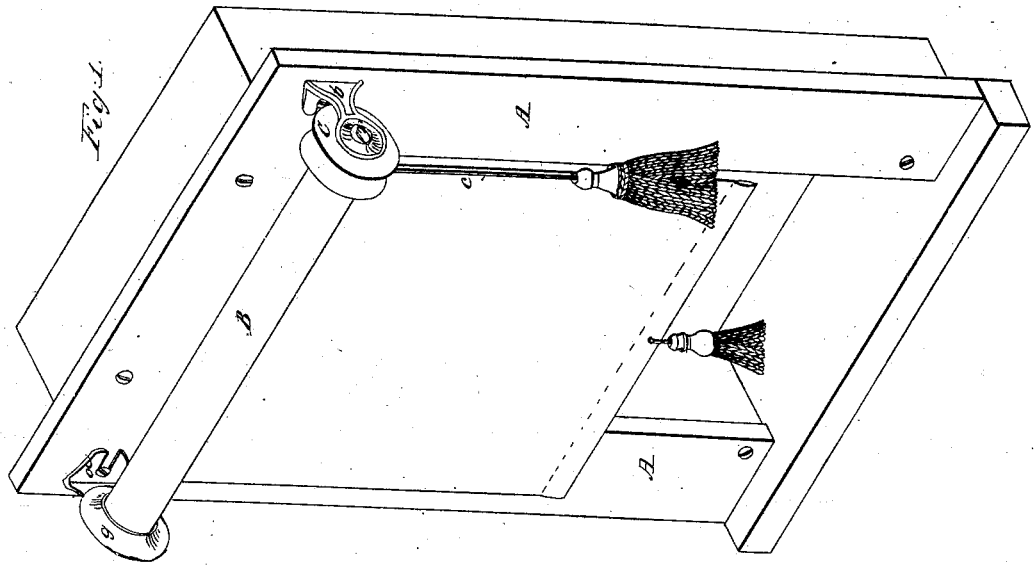
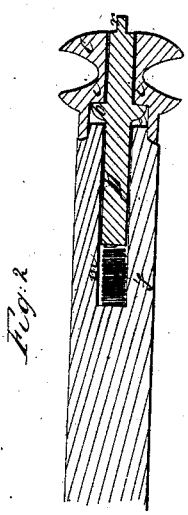
Witnesses
Inventor
Silas S. Putnam
by his attorney
Samuel Cooper
pr. Roach

UNITED STATES PATENT OFFICE.

SILAS S. PUTNAM, OF DORCHESTER, MASSACHUSETTS.

IMPROVED CURTAIN-FIXTURE.

Specification forming part of Letters Patent No. 35,779, dated July 1, 1862.

*To all whom it may concern:*

Be it known that I, SILAS S. PUTNAM, of Dorchester, in the county of Norfolk and State of Massachusetts, have invented an Improved Curtain-Fixture, of which the following is a full, clear, and exact description, reference being had to the accompanying drawings, making part of this specification, in which—

Figure 1 is a perspective view of the window frame, curtain, and fixture; Fig. 2, a section through part of the roll and spool.

Various curtain-fixtures have been made in which the weight of the curtain was supported in any required position by friction produced by a spring pressing the end of the roll or its journal against one of the brackets or supports in which the roll was hung. Where the necessary friction was thus produced, it required considerable care and nicety in hanging the fixture, as the position of the brackets or the support against which the end of the roll or its journal pressed determined in a measure the amount of friction produced.

The object of my present invention is to obviate this objection; and it consists in placing the friction-bearing within the roll itself or its cap independent of an exact or nice adjustment of the brackets or supports of the roll, so that the fixture may be hung by other than skilled operatives.

That others skilled in the art may understand and use my invention, I will proceed to describe the manner in which I have carried it out.

In the said drawings, A is the window-frame, to the sides of which are attached the brackets *a b*. The roll B, to which the curtain is attached, has at one end a journal or pin, which revolves freely in a round hole in the bracket *a*. To the other end of the roll is attached (glued or otherwise fastened) the spool C, over which the winding-cord *c* is wound. This spool is turned out at *e* beyond where it is attached to the roll, forming a bearing or shoulder, *i*. A hole or recess, *m*, is formed in the end of the roll in its axis, in the bottom of which is placed a brass spiral spring, *f*, which bears against the end of a pin or shaft, D, of the form shown in Fig. 2. This shaft projects through the spool C, (which is free to turn on it,) and has a collar, *o*, which bears against the shoulder *i* of the spool to produce the necessary friction.

It is of course necessary that the pin D should not revolve with the spool and roll. I therefore form its outer end with a tenon, *r*, which is a square or parallelogram in cross-section and fits in a corresponding hole or slot in the bracket *b*.

The tenon *r* may be of any convenient length, and it is evident that as the surfaces which produce the friction necessary to hold the roll in position are within the roll itself or its spool, and the brackets *a b* are only employed to support the weight of the roll and prevent the pin D from revolving, it is not necessary that any nice adjustment of the brackets or supports should be made, either as to their exact distance apart or their being exactly square or at right angles to the axis of the roll, and this fixture may be put up by persons purchasing them without requiring the assistance of a skilled mechanic.

The friction-shaft D may, when preferred, be applied to the other end of the roll within the cap *g*, the bracket *a* being changed to receive the square tenon *r*.

A recess similar to *e* may be made in the outer face of the spool C, and the spring *f* may be so applied to the shaft D on the other side of the spool as to cause a collar similar to *o* to bear against this side of the spool; but I prefer the arrangement first described.

What I claim as my invention, and desire to secure by Letters Patent, is—

The above-described curtain-fixture, in which the friction necessary for holding the weight of the curtain is produced between the roll B or its spool or cap and the friction-shaft D, which is held from revolving, substantially as set forth.

SILAS S. PUTNAM.

Witnesses:
 THOS. R. ROACH,
 NORMAN W. STEARNS.